United States Patent [19]

Tokuyama

[11] 4,307,417

[45] Dec. 22, 1981

[54] VIDEO SIGNAL REPRODUCING APPARATUS

[75] Inventor: Yoshio Tokuyama, Yokohama, Japan

[73] Assignee: Victor Company of Japan, Ltd., Yokohama, Japan

[21] Appl. No.: 137,418

[22] Filed: Apr. 4, 1980

Related U.S. Application Data

[63] Continuation of Ser. No. 933,837, Aug. 15, 1978, abandoned.

[30] Foreign Application Priority Data

Aug. 17, 1977 [JP] Japan .................................. 52-98577

[51] Int. Cl.$^3$ .............................................. H04N 5/76
[52] U.S. Cl. ..................................... 358/127; 360/10; 360/21; 360/33; 360/70
[58] Field of Search ....................... 360/10, 21, 33, 70, 360/75, 84, 104; 358/127

[56] References Cited

U.S. PATENT DOCUMENTS

| | | | |
|---|---|---|---|
| 3,215,772 | 11/1965 | Kihara | 360/33 |
| 3,588,334 | 6/1971 | Comros | 360/10 |
| 3,821,787 | 6/1974 | Kihara | 358/4 |
| 3,925,816 | 12/1975 | Kihara | 360/33 |
| 3,934,269 | 1/1976 | Fujita | 360/70 |
| 3,939,485 | 2/1976 | Amari | 358/4 |

*Primary Examiner*—Alan Faber

[57] ABSTRACT

A video signal reproducing apparatus uses a tape on which a video signal has been recorded along tracks disposed obliquely relative to the tape longitudinal direction. The tracks are mutually contiguous, with substantially no space therebetween. The tracks are recorded and formed by a pair of first and second rotating heads having gaps of mutually different azimuth angles. A control signal is also recorded interrelatedly with the start of the formation of each recording track by the first rotating head. A pair of first and second rotating heads have the same mutually different azimuth angles as the first mentioned first and second rotating heads and also have gaps at different height positions in the rotational planes relative to the centers of the track widths. These heads scan the tracks of the tape to reproduce the video signal. A control circuit reproduces the control signal from the tape and carries out a control so that the first rotating head starts scanning from the starting end of the track recorded and formed by the rotating head having the azimuth angle which is the same as the azimuth angle of the first rotating head. The tape transport mechanism is capable of causing the tape to travel at a speed which is different from the speed that is used at the time of recording. At least the second rotating head has a width which is greater than the track width, the width extending from the edge of the track with which scanning is to start to a phase advanced side, with respect to the tape transport direction.

6 Claims, 21 Drawing Figures

VIDEO SIGNAL REPRODUCING APPARATUS

This is a continuation of application Ser. No. 933,837, filed Aug. 15, 1978 now abandoned.

BACKGROUND OF THE INVENTION

The present invention relates generally to video signal, speed-change reproducing systems, and more particularly to a video signal, speed-change reproducing system for reproducing signals recorded on mutually adjacent tracks, alternately by means of two heads having mutually different azimuth angles and mutually different track widths. The video signal may thus be reproduced at a speed which is different from that used for making the recording.

The prior art uses a system wherein a video signal is recorded on a magnetic tape on parallel tracks formed obliquely relative to the longitudinal direction of the magnetic tape. This tape travels at a speed which is different from that used at the time of recording. Or, the tape may stop. Thus, the tape transport provides a speed-change reproduction such as quick-motion reproduction, slow-motion reproduction, or still picture reproduction. In this system, the tape speed at the time of reproduction is different from that at the time of recording; therefore the path (track) which the head traces on the tape during reproduction is different from the path (track) traced by the head during recording.

On the one hand, a conventional video signal recording and reproducing system, ordinarily, forms tracks on a recording medium in a manner which leaves an unrecorded zone or band called a guard band between neighboring tracks, in order to prevent the generation of beats caused by the reproduced signals of neighboring tracks due to tracking deviation of the head at the time of reproduction. When a tape recorded in this manner is played back at a speed-change reproduction, as described above, the head traces over the track and the unrecorded band. When the head traces over the unrecorded band, the level of the reproduced signal is lowered remarkably or it disappears. For this reason, noise is generated in the reproduced picture. Furthermore, in the above mentioned system, the unrecorded bands between tracks give a poor utilization efficiency of the tape.

In addition, there has been a system wherein the angle of inclination of the tape, relative to the head rotating plane, is varied in accordance with the tape speed so that the heads will trace accurately over the track at the time of speed-change reproduction. However, this system has been accompanied by the twin problems of the complexity of the mechanism for varying the inclination angle of the tape, which gives rise to high cost of the apparatus, and by the difficulty of accurately tracking in actual practice.

On the other hand, a system wherein tracks are formed on a tape without gaps between neighboring tracks has been previously proposed. Moreover a color video signal can be recorded and reproduced without the occurrence of beat disturbance. Please see the U.S. patent application Ser. No. 731,935 entitled "Color video signal recording and/or reproducing system" filed Oct. 13, 1976, by Akira Hirota, inventor, and assigned to Victor Company of Japan, Ltd., the same assignee of the present invention, now U.S. Pat. No. 4,178,606. In this previously described system, a pair of azimuth heads have gaps which are inclined, with a certain azimuth angle, in mutually opposite directions with respect to the direction perpendicular to the longitudinal direction of the track. Neighboring tracks are formed in contiguous contact, side-by-side relationship without a gap therebetween. Furthermore, the phase of the chrominance signal is shifted by 90 degrees for every horizontal scanning period. Moreover, the direction of this phase shifting Further, accordance with this system, the tape utilization efficiency is high since the tracks are in close contact with each other, and, moreover, there is no occurrence of beat disturbance.

Accordingly, the present applicant has previously a novel and useful system has been previously proposed for speed-change reproduction of video signals, which system is effectively applicable particularly to the above mentioned previously proposed system, and in which the above described difficulties have been overcome, in the U.S. patent application Ser. No. 892,147 entitled "Video signal speed-change reproducing system" filed Mar. 31, 1978, by Akira Hirota, inventor, and assigned to Victor Company of Japan, Ltd., the same assignee of the present invention, now abandoned.

In this system, by selecting the tape speed at a specific value at the time of reproduction, the noise bar is always produced at a certain position on the picture screen. Furthermore, if the relative scanning phases of the heads on the tape have a specific relationship to the tape, the noise bar can be positioned at an inconspicuous or invisible position on the picture screen. Furthermore, by using heads having mutually different azimuth angles and different track widths, signal reproduction can be carried out so that the reproduced signal level does not become zero. The vertical synchronizing signal is reproduced even when the reproduced signal level becomes a minimum. The vertical synchronization can be positively obtained even when a noise bar is produced due to the minimum reproduced signal level, within a vertical blanking period.

However, this described system has the problem that it is necessary to change over the tracking adjustment in response to changes of the tape speed, so that the heads can start reproducing from a desired position on the track.

SUMMARY OF THE INVENTION

Accordingly, it is an object of the present invention to provide a novel and useful video signal reproducing apparatus in which the above described problems have been solved.

Another and specific object of the invention is to provide a video signal reproducing apparatus which is capable of producing a reproduced signal of relatively high level without accompanying beat noise even at the time of speed-change reproduction such as double-speed fast-motion reproduction. Moreover, the system does not require tracking adjustment.

Still another object of the invention is to provide a video signal reproducing apparatus using a pair of rotating heads. At least the rotating head, which is unrelated to positive tracking control, has a width greater than the track width.

Other objects and further features of the present invention will be apparent from the following detailed description when read in conjunction with the accompanying drawings.

DETAILED DESCRIPTION

In the description which follows, it will be convenient to refer to "positive tracking" and "reverse tracking". These terms are used with the following meaning:

"positive tracking" means to trace a track by a reproducing head having an azimuth angle which is coincident with and the same as the azimuth angle of the recording head which recorded the track;

"reverse tracking" means to trace a track by a reproducing head having an azimuth angle which is different from or opposite to the azimuth angle of the recording head which recorded the track.

Figure 1:
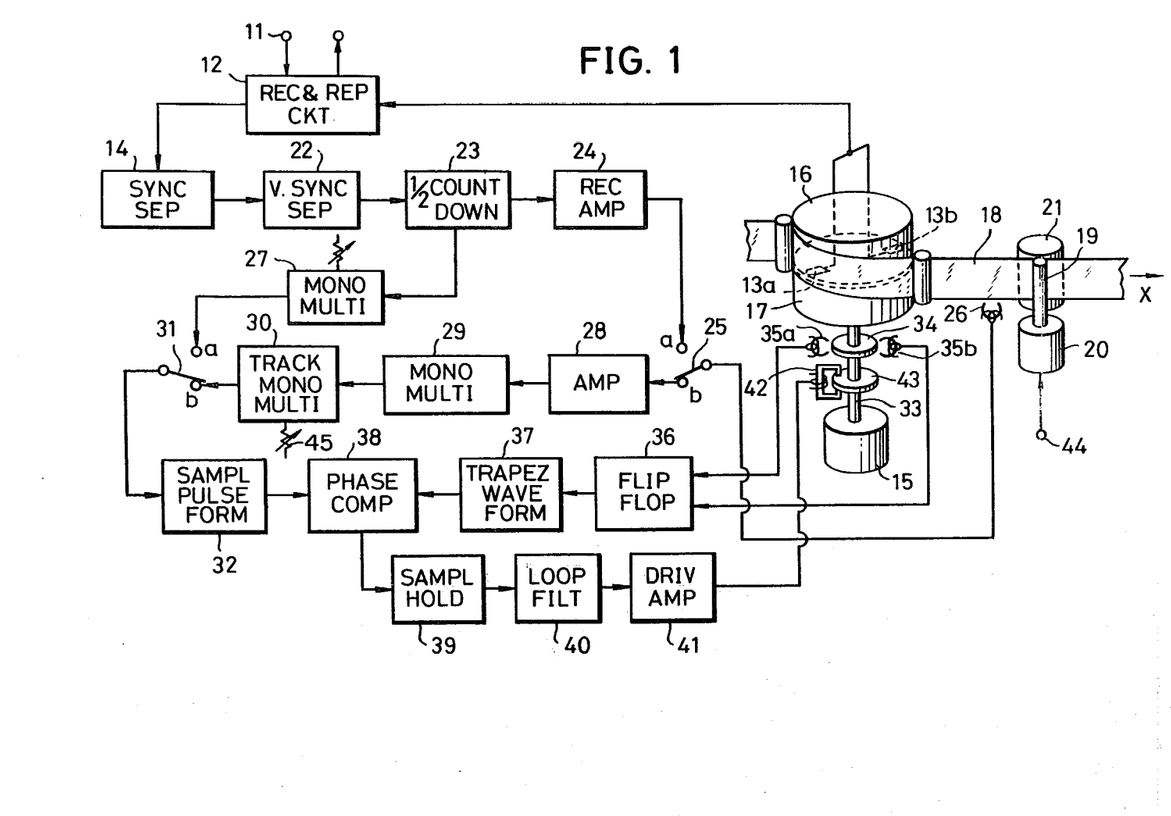
FIG. 1 is a block diagram of one embodiment of the video signal reproducing apparatus according to the present invention.

Therefore, if the same heads are used for both recording and reproducing, as shown in FIG. 1, I call it "positive tracking" when the head 13a traces the track which the head 13a itself recorded. I call it "reverse tracking" when the head 13a traces the track which the head 13b recorded.

Figure 2:
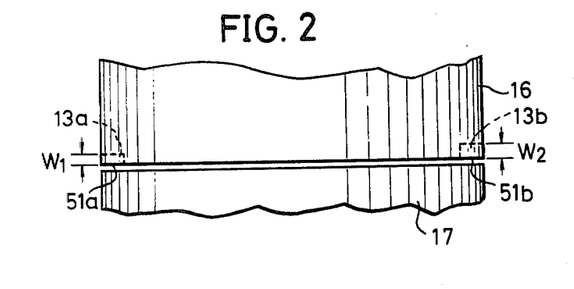
FIG. 2 is a fragmentary side view of one part of a guide drum showing video heads.
Figure 3:
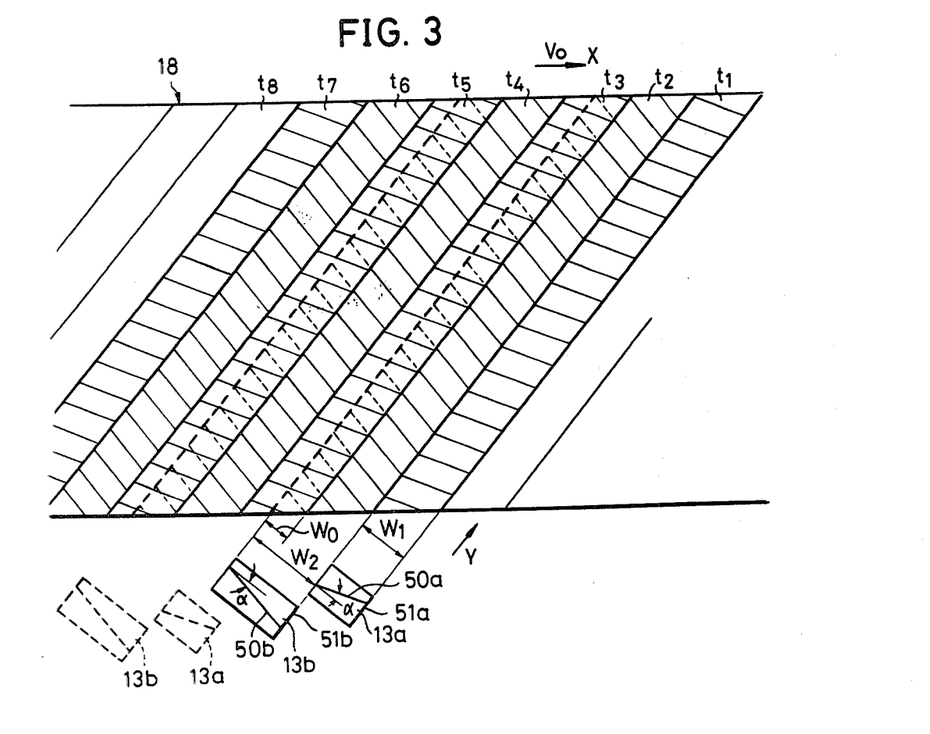
FIG. 3 is a track pattern diagram for a description of the recording track formation.

Referring first to FIG. 1, a video signal to be recorded is introduced into the system through an input terminal 11 and is passed through a recording and reproducing circuit 12 to a pair of recording and reproducing video heads 13a and 13b and to a synchronizing signal separation circuit 14. The video heads 13a and 13b have mutually opposite azimuths and mutually different track widths as shown in FIG. 3. The heads are mounted on diametrically opposite sides of a rotary drum 16 which is rotated at a rotational speed of 30 rps. by a motor 15. The lower end faces of the video heads 13a and 13b are on the same reference plane as shown in FIG. 2. The width of the video head 13b is larger than the width of the video head 13a. A magnetic tape 18 is wrapped obliquely around the rotary drum 16 and a stationary drum 17 and is driven to travel in the arrow direction X at a speed Vo by a pinch roller 21 and a capstan 19 combination driven by a motor 20. A video signal is recorded by the video heads 13a and 13b alternately along tracks on the tape 18, successively one field per track, the tracks being obliquely relative to the longitudinal direction of the tape.

On the other hand, a synchronizing signal separated from the video signal by the synchronizing signal separation circuit 14 is supplied to a vertical synchronizing signal separation circuit 22, where a vertical synchronizing signal of a frequency of 60 Hz is separated out and then supplied to a ½ count-down circuit 23 to be ½ frequency-divided to 30 Hz. The resulting output signal of the ½ count-down circuit 23 is supplied on the one hand to a monostable multivibrator 27 and on the other hand is sent by way of a recording amplifier 24 and a switch 25, with its movable contact connected to its contact point a, to be recorded as a control signal by a control head 26 on the lower edge of the tape 18.

The monostable multivibrator 27 produces an output rectangular wave which rises in response to a signal from the ½ count-down circuit 23 and falls with a specific time constant. This output signal is sent through a switch 31 with its movable contact connected to its contact point a and is formed into a sampling pulse by a sampling pulse forming circuit 32. This sampling pulse is then supplied to a phase comparator (sampling circuit) 33.

The above mentioned rotary drum 16 is coaxially mounted on a vertical rotating shaft 33, which is driven by the motor 15 and rotates together with the rotary drum 16. A magnet is mounted on a rotating disc 34 fixed coaxially to the rotating shaft 33. Together with rotation of the rotary drum 16, pulses are obtained alternately by pickup heads 35a and 35b are supplied to and trigger a flip-flop circuit 36. The resulting output of the flip-flop circuit 36 is supplied to a trapezoid wave forming circuit 37 and formed into a trapezoid wave, which is then supplied to the phase comparator 38.

In the phase comparator 38, the sampling pulses from the sampling pulse forming circuit 32 sample the inclined part of the trapezoid wave. The resulting output signal of the phase comparator 38 is held by a sampling-hold circuit 39 and is supplied through a loop filter 40 for removing high frequency components and integrating to a driving amplifier 41 and a brake mechanism 42. The brake mechanism 42 applies a variable braking force against the rotating disc 43 fixed coaxially to the rotating shaft 33, whereby the rotation phases of the motor 15 and the rotary drum 16 are controlled.

In this connection, instead of controlling the brake mechanism, the rotation of the motor 15 may be controlled directly responsive to the output of the phase comparator 38.

At the time of reproduction, the rotation of the motor 20 is controlled in response to a driving signal introduced through a terminal 44 in accordance with the mode of speed-change reproduction. The tape 18 travels at a predetermined speed in accordance with the speed-change reproduction mode, as described hereinafter. At the time of reproduction, the moving contact of the switch 25 is switched to the contact point b, and the control signal reproduced from the control head 26 is supplied through the switch 25 and the amplifier 28 to the monostable multivibrator 29.

Since the gaps of the video heads 13a and 13b respectively have mutually opposite azimuths, no signal is reproduced due to azimuth losses when the video heads 13b and 13a respectively scan the tracks recorded by the video heads 13a and 13b (i.e., where "reverse tracking" is carried out). Then, at the time of normal reproduction, the rotational phase of the motor 15 is so controlled that the sampling pulses will sample the predetermined part of the slope of the trapezoid wave formed in correspondence with pulses from the pickup head. In this case, the pulses from the pickup heads 35a and 35b are generated in coincidence with the recording initiation positions of the heads 13a and 13b respectively. For this reason, in a normal reproduction mode, the controlled rotational phases of the video heads 13a and 13b cause them to always scan (positive tracking) the tracks recorded by these heads 13a and 13b, and the above mentioned reverse tracking does not occur.

The video heads 13a and 13b, as shown in FIG. 3, respectively have gaps 50a and 50b inclined by angle α in opposite directions relative to the direction perpendicular to the scanning direction, that is, have azimuths of the angle α. These video heads 13a and 13b have respectively different track widths W1 and W2 and are so provided that their respective lower end faces 51a and 51b are at the same reference plane of the rotary drum 16 as shown in FIG. 2.

Video signal recorded tracks are formed on the tape 18 by the heads 13a and 13b in the following manner. When the head 13a rotating in the arrow direction Y scans the tape 18 traveling in the arrow direction X, a recorded track t1 of the width W1 (=T) is formed obliquely to the longitudinal direction of the tape. Next, a recorded track t2 of the width W2 is formed obliquely in closed contact with the track t1 by the head 13b. When the head 13a scans the tape 18 with an overlap of a width Wo over the track previously formed by the head 13a, a recorded track t3 of the width T is formed. Here, the overlap width Wo is so set that Wo W2−T.

Since the recorded video signal has been frequency modulated, when a head scans and records a new signal with overlap over a track part which has been previously recorded, the previously recorded signal is erased by the bias effect of this new signal, and the new signal is recorded, as in known systems. Consequently, the signal recorded by the head 13b remains as a track t2 of the width T. Similarly thereafter, tracks t2, t4, t6, . . . (wherein the subscripts of t are even numbers) of width T are formed by the recording head 13a and by the erasing effect of the head in the overlap area. Tracks t1, t3, t5, . . . (wherein the subscripts of t are odd numbers) of width T are formed by the recording head 13a.

In this case, the tracks t1, t2, t3 . . . are in contiguous contact without gaps therebetween, whereby the tape utilization efficiency is high. Although not shown, an audio signal and a control signal are recorded respectively at the upper and lower lateral edges of the tape 18 along tracks extending in the longitudinal direction of the tape. In each track, the vertical synchronizing signal is located at a position which is a specific distance from the lower end of the track and in the vicinity thereof. The control pulse signal is recorded with the same timing as the vertical synchronizing signal. The detection pulses of the pickup heads 35a and 35b are detected with the same timing when the head records signals on the lower end of the track. For this reason, the control pulses and the detection pulses of the heads 35a and 35b have a phase difference $\theta°$ in accordance with the above mentioned specific distance.

Figure 4:
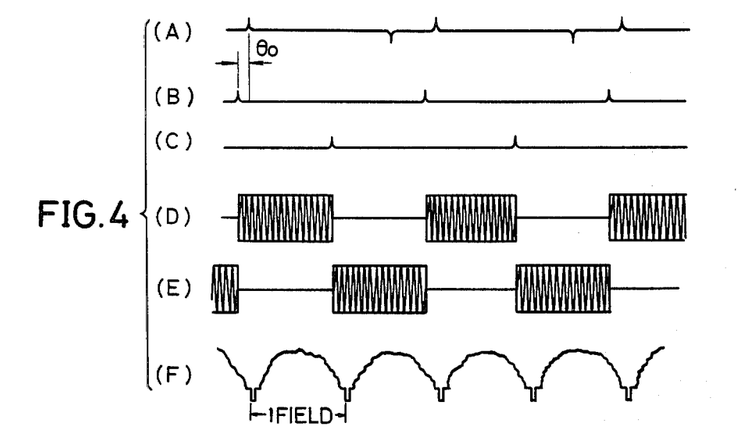
FIGS. 4(A) through 4(F) are time charts respectively indicating waveforms of signals at various parts of the apparatus at the time of normal reproduction.

During normal reproduction operation, the tape 18 is driven at a speed Vo. Furthermore, for reproducing the recorded signal, the switches 25 and 31 are connected to their respective contact points b. A control pulse having a waveform as indicated in FIG. 4(A), which has been reproduced through the head 26, is supplied by way of the switch 25 to the amplifier 28 and further to the monostable multivibrator 29. The resulting output of the monostable multivibrator 29 triggers the tracking monostable multivibrator 30, whose time constant has previously been adjusted and set by a tracking variable resistor 45. The resulting output of the tracking monostable multivibrator 30 is supplied by way of the switch 31 to the sampling pulse forming circuit 32. On the other hand, pulses of waveforms respectively indicated in FIGS. 4(B) and 4(C) are alternately obtained from the pickup heads 35a and 35b and supplied to the flip-flop circuit 36.

The phase comparator 38 samples the trapezoidal wave from the trapezoidal wave forming circuit 37 responsive to the sampling pulses from the sampling pulse forming circuit 32. The resulting output of the phase comparator 38 is applied by way of the sampling hold circuit 39, loop filter 40, and the driving amplifier 41 to the brake mechanism 42, which is similar to the braking at the time of recording. The rotational phase of the motor 15 is controlled so that the phase difference between the detection pulses as indicated in FIG. 4(B) of the head 35a and the control pulses as indicated in FIG. 4(A) will be $\theta°$. As a result, the video heads 13a and 13b respectively trace and reproduce the tracks t1, t3, . . . and t2, t4, . . . which they themselves have recorded. In this connection, since the width of the head 13b is greater than the track width T, a part of the adjacent track is also traced during the tracing of the tracks t2, t4, . . . , but there is substantially no reproduction of the signal of this adjacent track because of azimuth loss.

From the head 13a and 13b, FM signals are reproduced as indicated in FIGS. 4(D) and 4(E), respectively. These signals, after being rendered into continuous signals, are demodulated, and a reproduced video signal as indicated in FIG. 4(F) is obtained.

Figure 6:
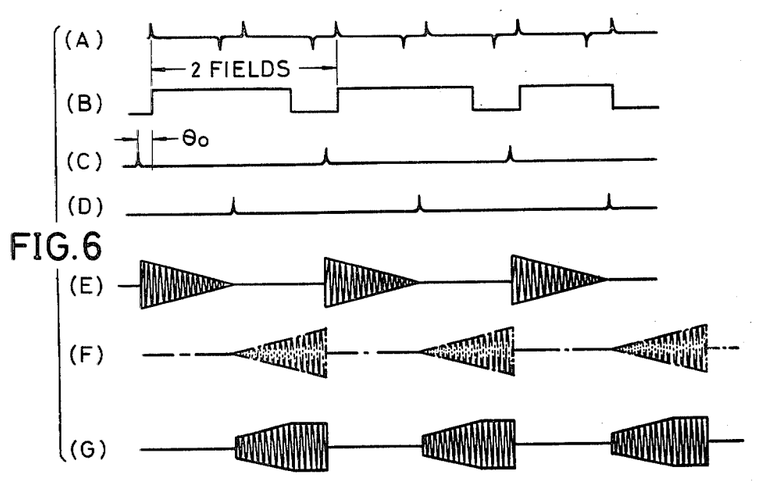
FIGS. 6(A) through 6(G) are time charts respectively indicating signal waveforms for a description of double-speed reproduction.

The double-speed fast (quick) motion reproduction mode of operation which fully exhibits the characteristics of the apparatus of the invention will now be described. In this reproduction mode, the capstan 20 rotates at double its normal speed, and the tape 18 is driven at twice the ordinary recording or reproducing speed Vo. Since the tape travel speed is 2 Vo, the frequency of the control pulses reproduced from the head 26 becomes twice the frequency that was recorded for use at the time of normal reproduction, as indicated in FIG. 6(A). However, since the time constant of the monostable multivibrator 29 is as indicated in FIG. 6(B) and is constant (the high-level period being greater than the one-field period), it does not respond with a proportion of one pulse for every two pulses with respect to the reproduced control pulses, and as an effective result, the monostable multivibrator 29 operates as a ½ count-down circuit.

Accordingly, although the tape travel speed is twice the normal speed, the operation of the servo circuit with respect to the brake mechanism 42 is the same as that at the time of normal reproduction. Control of the rotation of the motor 15 is so carried out that the output pulses of the pick-up heads 35a and 35b will become as indicated in FIGS. 6(C) and 6(D). The phase difference between the control pulses of FIG. 6(A) and the pulses of FIG. 6(C) will become $\theta°$. The video head 13a always scans from the starting end the tracks t1, t5, . . . which it, itself, has recorded.

Since the tape is traveling at double speed 2 Vo, the head 13a which begins to scan from the starting end of the track t1, for example, progressively deviates from the track t1 and terminates its scanning at a position where it scans the track t2. As a consequence, the level of the reproduced signal from the head 13a is a maximum at the instant of starting of track scanning. Thereafter, the signal level progressively decreases, and becomes a minimum at the terminal end of track scanning, as indicated in FIG. 6(E).

Figure 5:
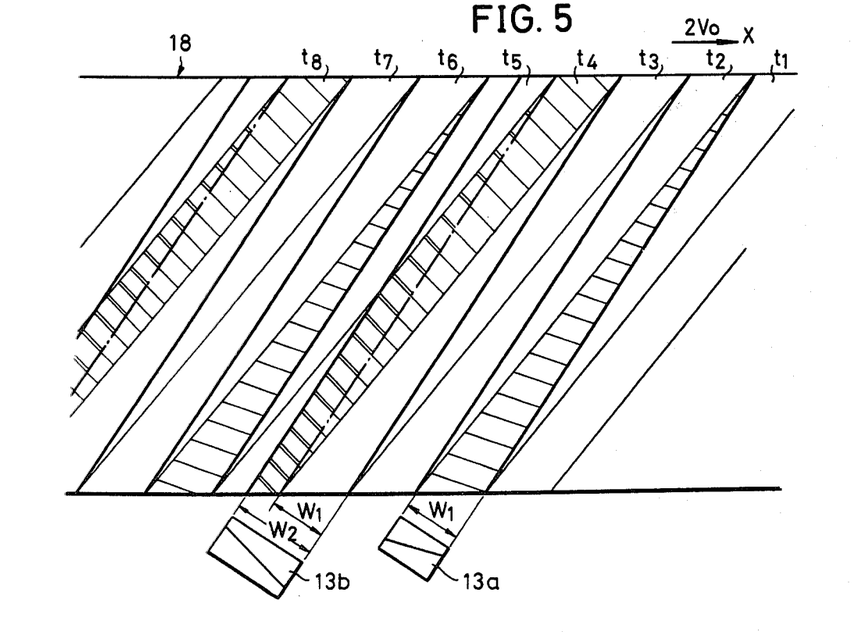
FIG. 5 is a scanning track pattern diagram for a description of double-speed fast (quick) motion reproduction by the apparatus of the invention.

Next, the head 13b commences scanning at a point where it straddles portions of the track t3 and the track t4 and terminates its scanning at a position wherein it straddles portions of the tracks t4 and t5. Since the tracking of the head 13b is positive with respect to the track t4 and reverse with respect to the tracks t3 and t6, the head 13b reproduces a signal from the track t4.

If the head 13b has the same width W1 as the head 13a, its scanning path becomes as indicated by single-dot chain line in FIG. 5, beginning its scanning from the starting end of the track t3 and finishing its scanning at the terminal end of the track t4. Accordingly, in this case, the level of the reproduced signal is a minimum at the instant when the track scanning starts, thereafter progressively increasing, and becoming a maximum at the terminal end of track scanning, as indicated in FIG. 6(F).

In the present invention, the width of the head 13b is selected at W2 ($>$W1). Thus the head 13b also reproduces the portion of the track indicated by double hatching. Accordingly, the level of the reproduced signal of the head 13b is higher than the level wherein its width is equal to W1. A reproduced signal of a certain level is obtained from the instant when track scanning begins. This level reaches a maximum at an instant before the scanning termination, as indicated in FIG. 6(G). As will be apparent from a comparison of FIGS. 6(F) and 6(G), in the apparatus of the present invention, the level of the reproduced signal obtained from the head 13b is particularly high, and there is little signal deterioration.

In the apparatus according to the present invention, the circuit control causes the phase difference between the detection pulses from the pick-up head 35a corresponding to the scanning start of the head 13a. The control pulses will be $\theta°$. The head 13a always begins scanning from a track which it, itself, has recorded. If the tape speed is 2 Vo, the scanning and reproducing states of the heads 13a and 13b will always be maintained in the above described state. For this reason, there is no necessity of variably adjusting the tracking resistor 45 in order to change the time constant of the monostable multivibrator 30.

Figure 7:
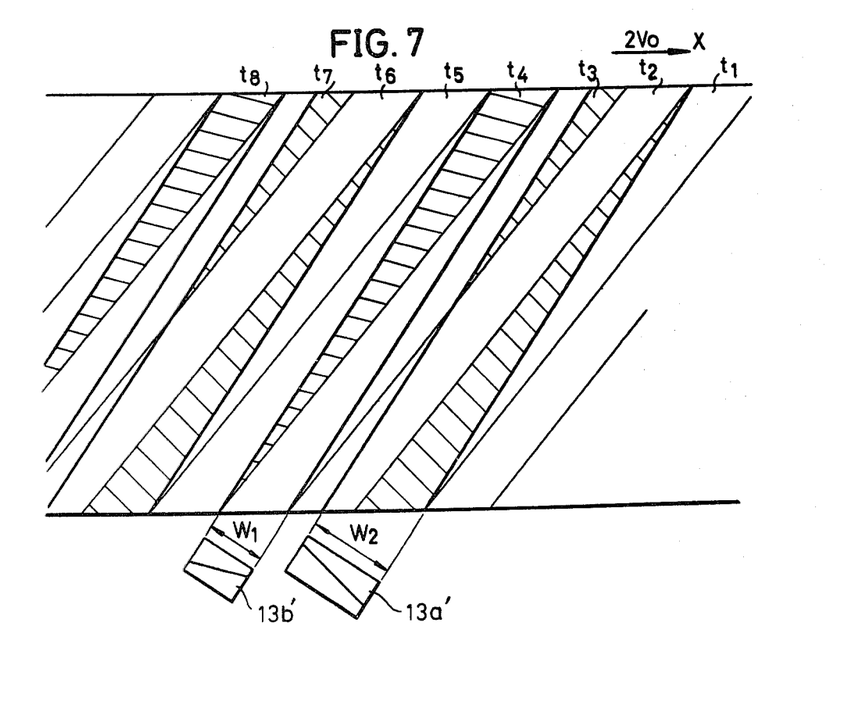
FIG. 7 is a scanning track pattern diagram for a description of undesirable double-speed reproduction which is not adopted in the apparatus of the invention.

If, contrary to that which is described above, a head 13a′ of large width W2 is used in place of the head 13a, and a head 13b′ of the width W1 is used instead of the head 13b, the scanning paths of these heads become as indicated in FIG. 7. More specifically, the head 13a′ starts scanning from a position where it straddles portions of the tracks t1 and t2 and terminates its scanning at a position where it straddles portions of the tracks t2 and t3. For this reason, the head 13a′ scans and reproduces the track t1. At the same time it, scans and reproduces also a portion of the track t3 in the latter half of the scanning. While the track t2 is scanned, since it is a reverse tracking, it is not reproduced because of azimuth loss, which is similar to the above described case.

Since the signals from both of the tracks t1 and t3 are reproduced in the latter half of the scanning operation of the head 13a′, beats occur in the reproduced signal, and the reproduced picture becomes disturbed. Therefore, it is necessary to adjust the head scanning position so that scanning will start from a position such that beats will not be produced in the reproduced signal. Accordingly, in the apparatus of the invention, selection is not made with respect to a head width relationship of this character.

More specifically, in the apparatus of this invention, the width of that one video head, of the pair of video heads, which starts track scanning and which generates rotational detection pulses (to be phase compared with the control pulses) is less than the width of the other video head. In the present embodiment of the invention, for example, the width of each track is 58 $\mu$m, and the width W2 of the head 13b is 95 $\mu$m.

If the heads 13a and 13b are set to start scanning the tape 18 from a position offset to the right side in FIG. 5 by a very small distance d, the width W1 of the head 13a can be made greater than the width T of the tracks (where W1$<$W2). In this case, the level of the reproduced signal of the head 13a, as a whole, also becomes slightly greater.

Figure 8:
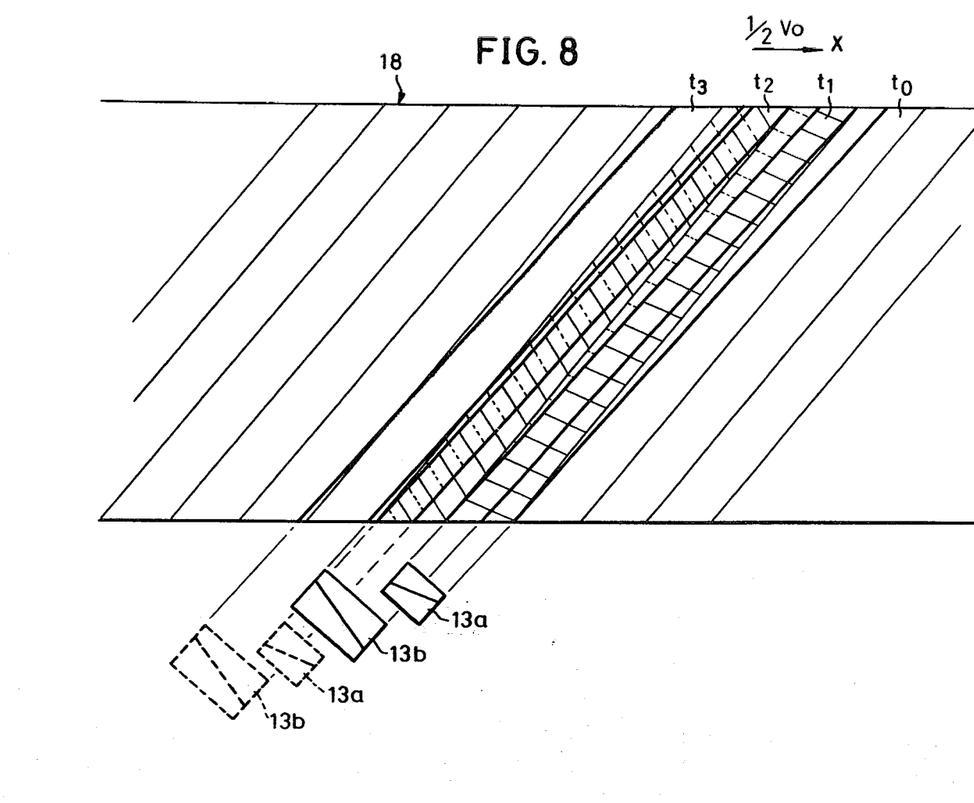
FIG. 8 is a scanning track pattern diagram for a description of half-speed slow-motion reproduction by the apparatus of the invention.

Next, the operation of half-speed slow motion reproduction will be described. The scanning paths on the tape by the heads 13a and 13b are indicated in FIG. 8. As is apparent from FIG. 8, after the head 13a starts scanning from the track t1 and terminates its scanning at a position where it straddles the tracks t1 and t0, the head 13b scans as it straddles the tracks t1 and t2. In this operation, since the width of the head 13b is large, it scans the track t2 excessively in comparison with the case where the width is small, whereby a high level of reproduced output is obtained. The other features of the operation can be readily inferred from the preceding description of the double-speed reproduction operation and, therefore, will not be described.

In the above described embodiment of the invention, the video signal reproducing apparatus is constituted to possess both of the capabilities of recording and reproducing. It may also be constituted to have only the reproducing capability as illustrated by the embodiment of the invention described hereinbelow.

Figure 9:
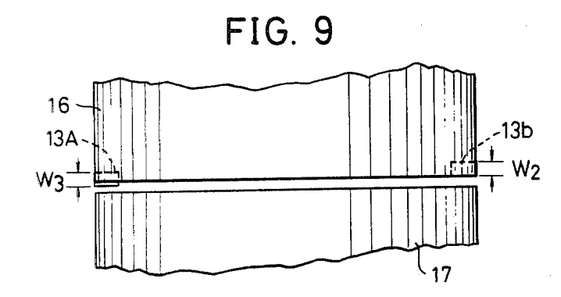
FIG. 9 is a fragmentary side view of one part of a guide drum showing video heads of another embodiment of the invention.

In the case of an apparatus exclusively for reproduction, as shown in FIG. 9, a video head 13A is mounted on the rotary drum 16 with its lower end face in a staggered position relative to the lower end face of the other head 13b. The width W3 of the head 13A is wider than the width W1, but is of the same order as the width W2 of the head 13b.

Figure 10:
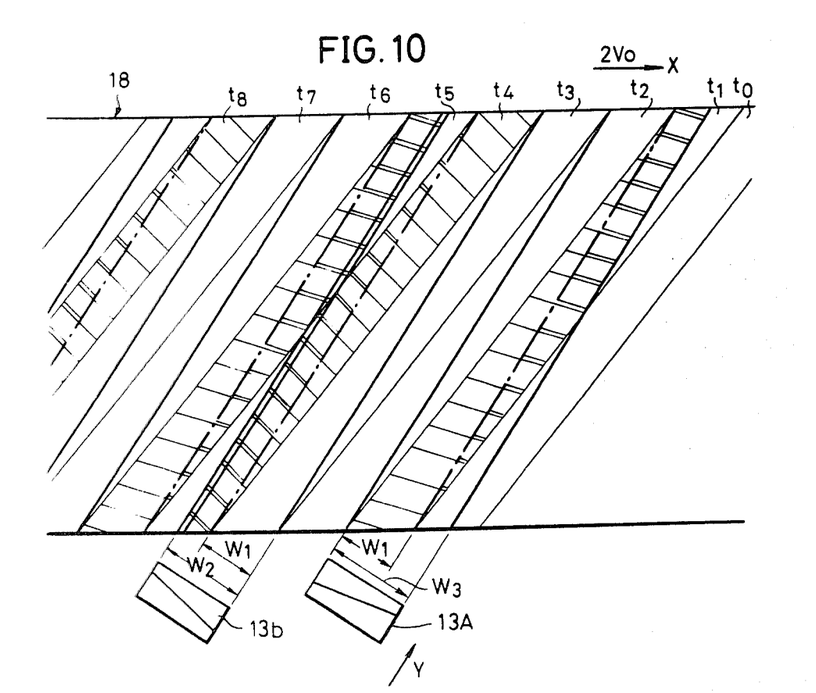
FIG. 10 is a scanning track pattern diagram for a description of double-speed fast (quick) motion reproduction by the video heads shown in FIG. 9.

In this case, the side in the same direction as the arrow direction X in FIG. 10 is the phase retardation side, while the side in the direction opposite to that of the arrow direction X is the phase advance side with respect to the video heads scanning in the arrow direction Y relative to the tape 18 traveling in the arrow direction X. Accordingly, the width of only the head 13b is expanded toward the phase advance side and thus made to assume the large value W2 relative to the same reference surface in the preceding first embodiment of the invention. In the present embodiment of the invention, the width of the head 13b is expanded toward the phase advance side and thus rendered into the large width W2. At the same time, the width of the head 13A is expanded to the phase retardation side and thus rendered into the large width W3.

Because it is necessary to form tracks of the same width at the time of recording, the end faces 51a and 51b of the heads 13a and 13b are set on the same reference surface in the first embodiment. However, in the present embodiment of the invention, recording is not carried out, and there is no such restrictive requirement, whereby a width selection as described above is possible.

In the double-speed fast (quick) motion mode of reproduction, as indicated in FIG. 10, the scanning path of the head 13b is similar to that illustrated in FIG. 5. The head 13A starts scanning from a position where it straddles portions of the tracks t1 and t0 and completes its scanning at a position where it straddles portions of the tracks t2 and t1. The head 13A has a width W3 greater than the width W1, and it reproduces a signal by scanning the track t1, over an area in excess of a width of W1, by the portion indicated by the double hatching. Accordingly, a reproduced signal of high level is obtained not only from the head 13b but also from the head 13A.

Further, this invention is not limited to these embodiments. Variations and modifications may be made without departing from the scope of the invention.

What is claimed is:

1. In a video signal reproducing apparatus for use with a tape on which a video signal is recorded along mutually contiguous tracks disposed obliquely relative to the longitudinal tape direction, said recorded tracks having substantially no space therebetween, each of said tracks having one field of the video signal recorded thereon by first and second alternately operating rotating recording heads which have gaps of mutually different azimuth angles, a control signal recorded on said tape, said control signal being interrelated with a vertical synchronizing signal of the video signal in each track recorded by said first rotating recording head, said apparatus comprising: first and second rotating reproducing heads which respectively have the same mutually different azimuth angles as the first and second rotating recording heads, said first and second rotating reproducing heads scanning the tracks to reproduce the video signal; a control head for reproducing the control signal recorded on the tape; means for generating a pulse in coincidence with a scanning of the starting end of each track by said first rotating reproducing head; tape transport means for transporting the tape at a speed which may include a speed that is different from the speed used at the time of recording; and control means for controlling an interrelationship between the tape travel and the rotational phase of the first and second rotating reproducing heads so that a predetermined phase difference is maintained between the control signal reproduced by said control head and the pulse corresponding to the scanning of the starting end of the track by the first rotating reproducing head; an improvement comprising:

means for rotating the track width centers of the first and secured rotating reproducing heads in mutually different planes;

said second rotating reproducing head having a track width which is greater than the width of the recorded track, said greater width being expanded from the edge of the track where scanning starts toward a phase advance side of the track with respect to the tape travel direction; and said first rotating reproducing head having a track width which is less than the track width of said second rotating reproducing head.

2. A video signal reproducing apparatus as claimed in claim 1 in which the same rotating heads are used for recording and reproducing, and said rotating heads are disposed so that their end faces are on the same reference plane.

3. A video signal reproducing apparatus as claimed in claim 1 in which said tape transport means causes the tape to travel at a speed which is twice the tape speed that is used at the time of recording, whereupon said second rotating reproducing head begins scanning a portion of the track recorded by the second rotating recording head, with the scan beginning at the starting end of said track and completing upon a scanning of all of said track.

4. A video signal reproducing apparatus as claimed in claim 1 in which said tape transport means causes the tape to travel at a speed which is one half of the tape speed at the time of recording, whereupon said second rotating reproducing head scans the whole width of the track recorded by the second rotating recording head at the starting end of said track and scans a portion of said track at the finishing end of said track.

5. A video signal reproducing apparatus as claimed in claim 1 in which said first rotating reproducing head has a width greater than the track width, said width being expanded from the edge of the track, where scanning starts, to a phase retardation side with respect to the tape travel direction.

6. A video signal reproducing apparatus as claimed in claim 1 further comprising monostable multivibrator means disposed between the control head and the control means, means responsive to the control signal reproduced by the control head for passing the control signal through said monostable multivibrator means in its stable state, and for thereupon changing its stable state into its unstable state for the duration of a predetermined time period following the control signal, means responsive to said monostable multivibrator means in its unstable state for preventing the control signal from passing therethrough, the duration of said predetermined time period being greater than one field period of the video signal, said control means controlling the interrelation between the tape travel and the rotational phase of the first and second rotating reproducing heads to maintain a predetermined phase difference between the control signal passed through the monostable multivibrator means and the pulse corresponding to the scanning of the starting end of the track by the first rotating reproducing head.

* * * * *